(12) United States Patent
Wong et al.

(10) Patent No.: US 9,817,500 B2
(45) Date of Patent: Nov. 14, 2017

(54) MECHANISM FOR FACILITATING FLEXIBLE WRAPAROUND DISPLAYS FOR COMPUTING DEVICES

(71) Applicant: Intel Corporation, Santa Clara, CA (US)

(72) Inventors: Hong W. Wong, Portland, OR (US); Wah Yiu Kwong, Beaverton, OR (US); Tao Jiancheng, Shanghai Changning District (CN); Min Liu, Portland, OR (US); Xiaoguo Liang, Pudong Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 67 days.

(21) Appl. No.: 14/358,003

(22) PCT Filed: Dec. 27, 2013

(86) PCT No.: PCT/US2013/077953
§ 371 (c)(1),
(2) Date: May 13, 2014

(87) PCT Pub. No.: WO2015/099760
PCT Pub. Date: Jul. 2, 2015

(65) Prior Publication Data
US 2015/0261366 A1    Sep. 17, 2015

(51) Int. Cl.
*G06F 3/041* (2006.01)
*G06F 3/01* (2006.01)
(Continued)

(52) U.S. Cl.
CPC .......... *G06F 3/0412* (2013.01); *G06F 1/1626* (2013.01); *G06F 1/1643* (2013.01);
(Continued)

(58) Field of Classification Search
CPC ...... G06F 3/017; G06F 3/0412; G06F 3/0488; G06F 2203/04102; G09F 9/00
(Continued)

(56) References Cited

U.S. PATENT DOCUMENTS

2010/0045705 A1 *  2/2010  Vertegaal ........... A47G 19/2227
                                                    345/661
2010/0053073 A1    3/2010  Cohen et al.
(Continued)

FOREIGN PATENT DOCUMENTS

| KR | 10/2010/0019164 | 2/2010 |
| KR | 10/2011/0017858 | 2/2011 |
| WO | WO-2011/114190 | 9/2011 |

OTHER PUBLICATIONS

PCT/US2013/077953, "Notification of Transmittal of the International Search Report and the Written Opinion of the International Searching Authority, or the Declaration" dated Sep. 26, 2014, pp. 14.
(Continued)

*Primary Examiner* — Michael Pervan
(74) *Attorney, Agent, or Firm* — Blakely, Sokoloff, Taylor & Zafman LLP

(57) ABSTRACT

A mechanism is described for facilitating flexible wraparound displays at computing devices according to one embodiment. A method of embodiments, as described herein, includes placing a flexible wraparound display at a computing device, where the flexible wraparound display being represented as a single display that is flexibly wrapped around the computing device. The method may further include calibrating the flexible wraparound display for performing its functions using one or more default components of the computing device.

27 Claims, 10 Drawing Sheets

(51) Int. Cl.
*G06F 3/0488* (2013.01)
*G06F 1/16* (2006.01)
*G06F 1/32* (2006.01)

(52) U.S. Cl.
CPC .......... *G06F 1/1652* (2013.01); *G06F 1/3262* (2013.01); *G06F 3/017* (2013.01); *G06F 3/0488* (2013.01); *G06F 3/04883* (2013.01); *G06F 2203/04102* (2013.01); *Y02B 60/32* (2013.01)

(58) Field of Classification Search
USPC ..... 178/18.01–19.07; 345/74–107, 173–178; 715/863
See application file for complete search history.

(56) References Cited

U.S. PATENT DOCUMENTS

2013/0038552 A1* 2/2013 Chan .................. G06F 3/04883
345/173
2013/0076612 A1 3/2013 Myers
2013/0106760 A1* 5/2013 Pedersen ............. G06F 3/03545
345/174

OTHER PUBLICATIONS

International Preliminary Report for PCT Application No. PCT/US2013/077953 dated Jun. 28, 2016, 9 pages.

* cited by examiner

MECHANISM FOR FACILITATING FLEXIBLE WRAPAROUND DISPLAYS FOR COMPUTING DEVICES

CROSS-REFERENCE TO RELATED APPLICATION

This patent application is a U.S. National Phase Application under 35 U.S.C. §371 of International Application No. PCT/US2013/77953, filed Dec. 27, 2013, entitled MECHANISM FOR FACILITATING FLEXIBLE WRAPAROUND DISPLAYS FOR COMPUTING DEVICES by Hong W. Wong, et al., the benefit and priority are claimed thereof and the entire contents of which are incorporated herein by reference.

FIELD

Embodiments described herein generally relate to computers. More particularly, embodiments relate to a mechanism for facilitating flexible wraparound displays for computing devices.

BACKGROUND

Traditionally, computing devices have had a single display. Some computing devices may have two displays but having more than one display requires complicated mechanism, electrical, and user experience (UX) designs at a significantly increased cost.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a technique for facilitating a single wraparound and continuous display (also referred to as "display screen") at a computing device (e.g., smartphone, tablet computer, etc.) such that the display is flexible and curved around the computing device to solve the current issues, such as navigational issues, relating to a single display or multiple, but separate, displays. Further, this novel single wraparound display overcomes other complications and challenges (such as mechanical and electrical setups, cumbersome UX designs, high device costs, navigational limitations, space inefficiencies, etc.) that are typically associated with the conventional single or multiple displays.

Figure 1:
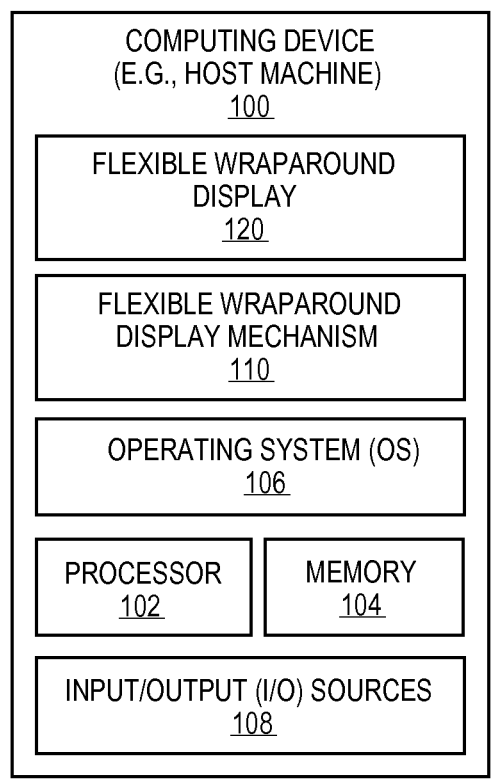
FIG. 1 illustrates a flexible wraparound display mechanism and a flexible wraparound display at a computing device according to one embodiment.

FIG. 1 illustrates a flexible wraparound display mechanism 110 and a flexible wraparound display 120 at a computing device 100 according to one embodiment. Computing device 100 serves as a host machine for hosting flexible wraparound display mechanism ("display mechanism") 110 that includes a combination of any number and type of components for facilitating employment and navigational use a flexible and wraparound display, such as flexible wraparound display (flexible display) 120, at computing device 100. Computing device 100 may include large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), smart televisions, wearable devices, media players, etc.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2A:
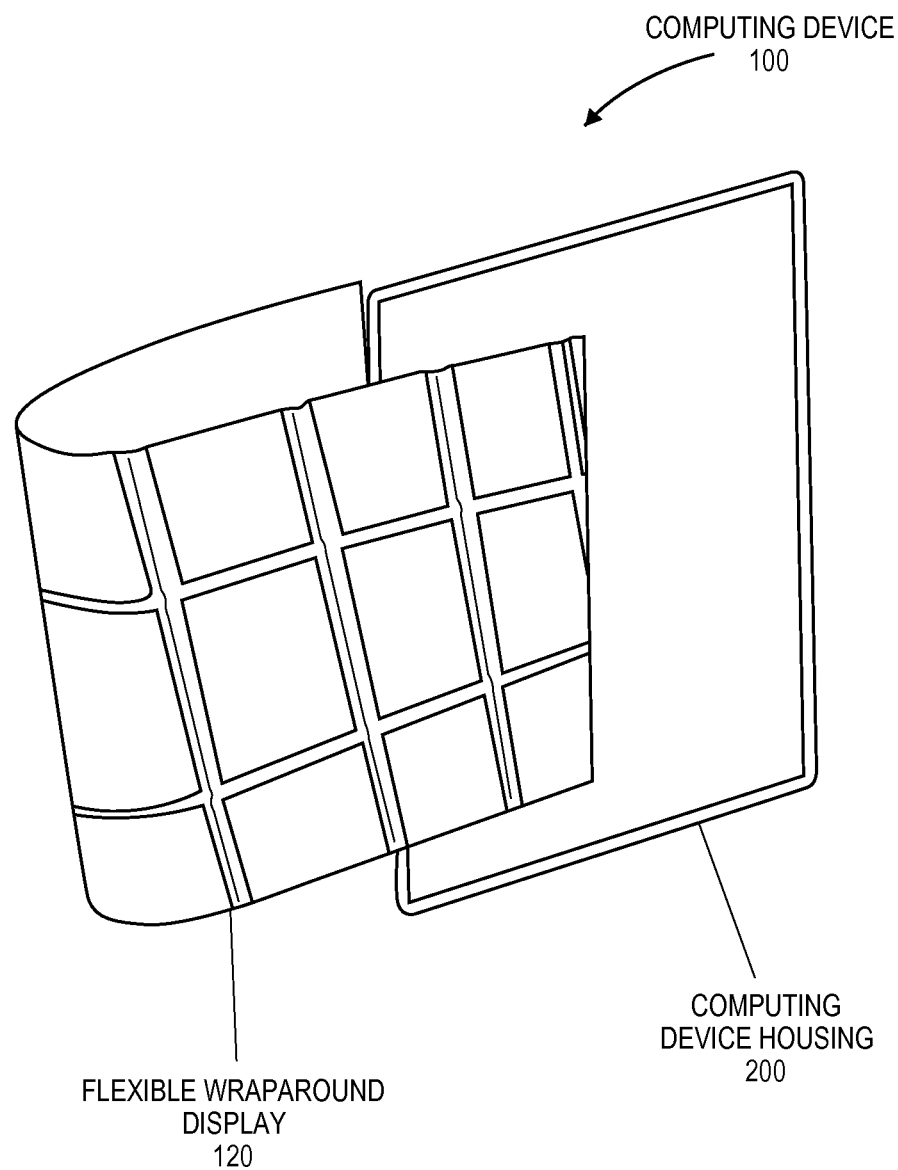
FIG. 2A illustrates a flexible wraparound display according to one embodiment.

FIG. 2A illustrates a flexible wraparound display 120 according to one embodiment. As illustrated, computing device 100 may include computing device housing 200 to hold any number of computing component, such as a processor, a memory, a display controller, etc. In the illustrated embodiment, a single flexible wraparound display, such as flexible wraparound display 120, is wrapped around housing 200.

Figure 2B:
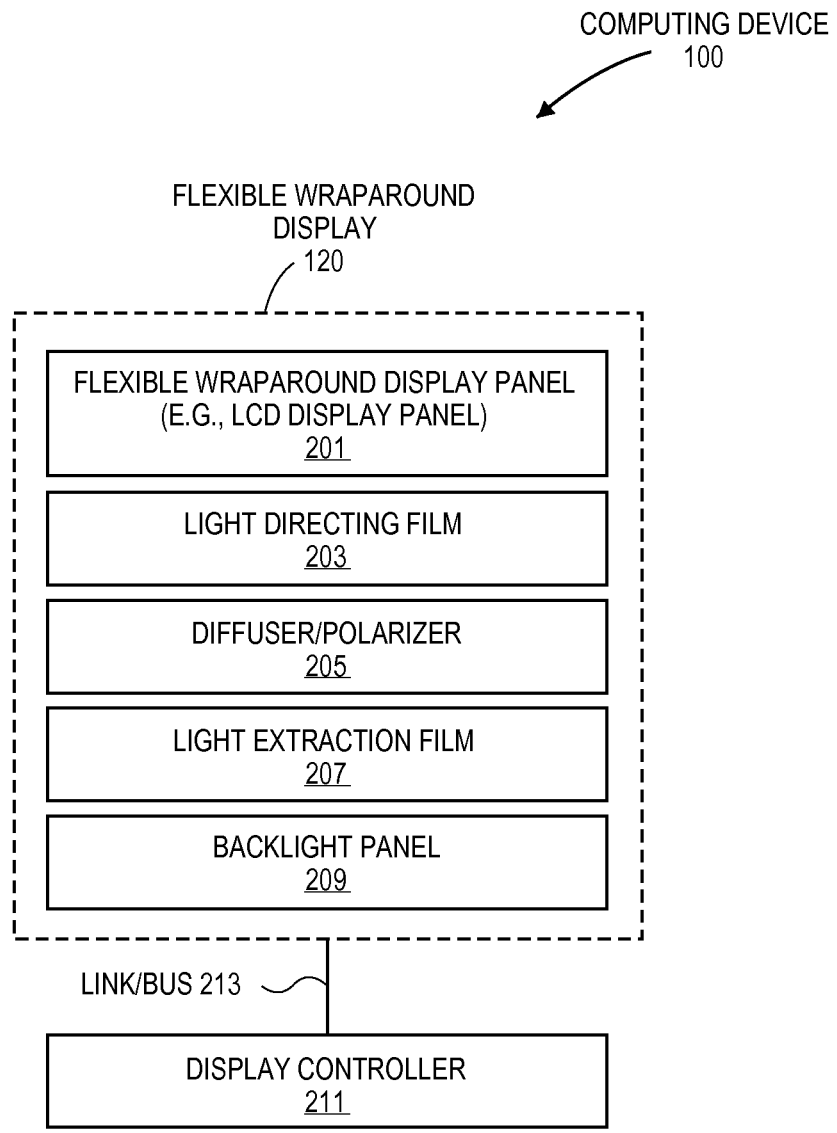
FIG. 2B illustrates a flexible wraparound display according to one embodiment.

FIG. 2B illustrates a flexible wraparound display 120 according to one embodiment. In one embodiment, flexible display 120 may be communicatively coupled to display controller 211 via one or more communication links or buses 213. Further, in one embodiment, flexible display 120 may include a flexible wraparound display panel, such as flexible wraparound display panel ("flexible display panel") 201 including (but not limited to) a flexible wraparound liquid crystal display (LCD) panel, in communication with a backlight assembly including light directing film 203, diffuser/polarizer 205, light extraction film 207, and backlight panel 209. Diffuser/polarizer 205 may act as a polarizer to polarize light emitted by light-emitting diodes (LEDs) in the backlight assembly. In one embodiment, flexible display panel 201, may be positioned adjacent light directing layer, and may include (but is not limited to) a twisted nematic LCD, an in-plane switching LCD, a vertical alignment (VA) LCD, and may include other components for display image formation, such as thin-film-transistor (TFT) backplane, polarizer, analyzer, color filter array, etc. Further, for example, flexible display panel 201 may include an OLED display which may not require a backlight.

Figure 2C:
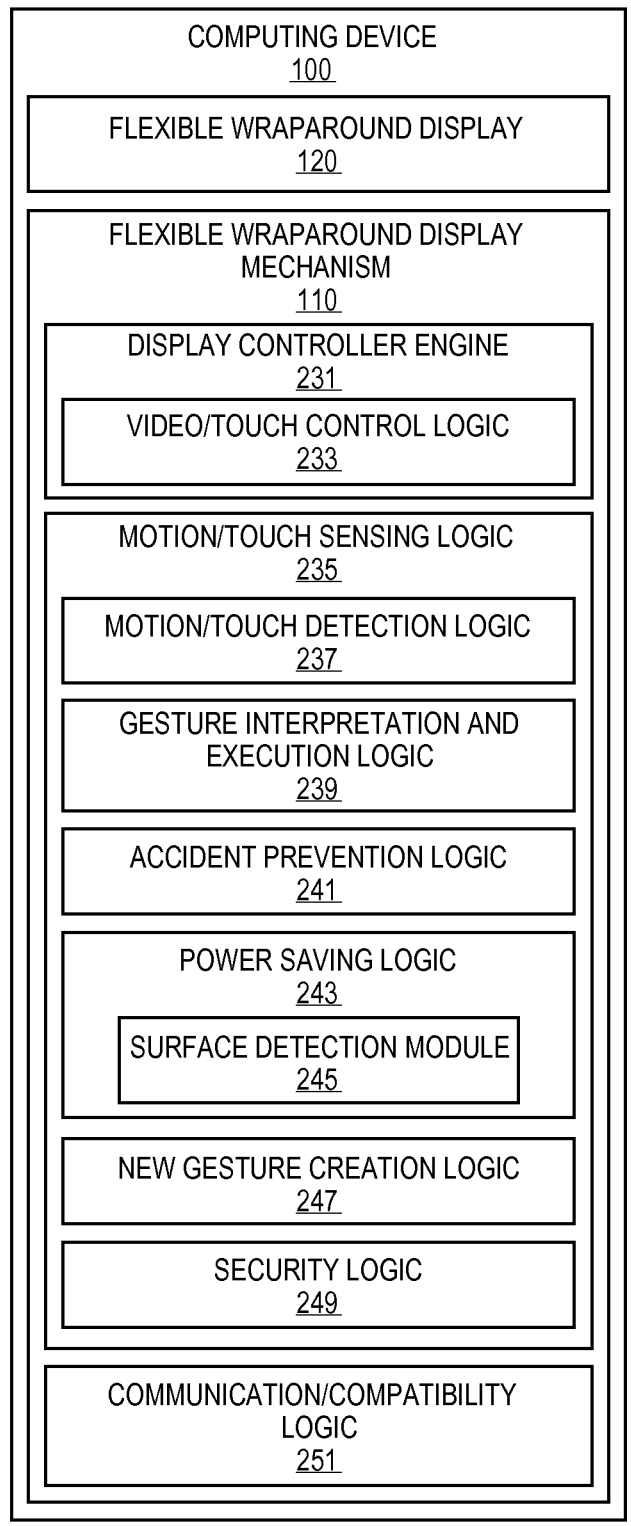
FIG. 2C illustrates a flexibility wraparound mechanism according to one embodiment.

FIG. 2C illustrates a flexibility wraparound mechanism 110 according to one embodiment. In one embodiment, display mechanism 110 may be employed at computing device 100 serving as a host machine, such as a laptop computer, a desktop computer, a smartphone, a tablet computer, etc. In one embodiment, display mechanism 110 may include any number and type of components, such as: display controller engine 231 including video/touch control logic 233; motion/touch sensing logic 235 including motion/touch detection logic 237, gesture interpretation and execution logic 239, accident prevention logic 241, power saving logic 243 including surface detection module 245, new gesture creation logic 247, security logic 249; and communication/compatibility logic 251.

In one embodiment, display controller engine 231 facilitates a display controller, such as display controller 211, to perform the necessary tasks without having to employ or use an additional or a different display controller. In one embodiment, video/touch control logic 233 facilitates the already-employed display controller 211 for displaying videos and/or for sensing the human touch when a user touches flexible display 120. In other words, for example, display controller engine 231, via video/touch control logic 233, may facilitate a single display controller 211 and its corresponding components, such as a graphics controller, a touch controller, a motion controller, a video/touch interface, cables/wires, etc., to support all the necessary tasks and functions relating to video and/or touch for flexible display 120 without having to require any additional hardware, such as controllers, interfaces, cables/wires, etc. For example, many of the conventional dual display devices have to either employ multiple controllers and/or additional hardware to support both displays, which can be costly and adds to the size of the device, or discriminate between the two displays in supporting certain features (e.g., touch input) on only one of the displays which can, in some ways, be cumbersome while defeating the purpose of having dual displays. In one embodiment, having a single display controller 211 of FIG. 2B to work with flexible display 120 along with display mechanism 110 may provide and support all the necessary features while having employed a single display controller 211 of FIG. 2B and without having to add size and/or cost to computing device 100 with additional hardware, etc.

In one embodiment, motion/touch sensing logic 235 may be used to detect, interpret, and apply various forms of motions and touches initiated by users or other objects. For example, motion/touch detection logic 237 may be used to detect motion and/or touch of users and/or objects, such as detecting a user's touching of flexible display 120 wrapped around computing device 100 whether it be on the front, back, or side of computing device 100. Similarly, for example, if computing device 100 is placed on a table, the side of flexible display 120 that is facing the table may be detected as touching (or facing) the table by motion/touch detection logic 237 and provided input to power saving logic 243 for power saving measures. In one embodiment, motion/touch detection logic 237 may facilitate a special sensor of computing device 100 to sense the density of the surface next to the sensor to determine if computing device 100 is being held with a human hand or rested on an object, such as a table, and forward the information to surface detection module 245 of power saving logic 243 to determine whether the part of flexible display 120 touching (or facing) the object may remain on or be turned off to save power and extend the battery life of computing device 100.

In one embodiment, power saving logic 243 may be used to facilitate the existing power components, wires, cables, etc., at computing device 100 to continue to support the various tasks and functions of flexible display 120. Further, power saving logic 243 includes surface detection module 245 to receive surface detection information from motion/touch detection logic 237 and accordingly, initiate various power saving measures. For example, upon detecting a surface, such as a table, an inside of a shirt or coat pocket, a pillow, a backpack, a purse, etc., touch/motion detection logic 237 may provide the detection information to surface detection module 245 which may then facilitate dimming of (and eventually turning off) the backlights associated with that part of flexible display 120 that is touching (or facing) the surface so that the power (e.g., battery power, electric power, etc.) may be conserved (while the lights associated with other parts of flexible display 120 may remain on).

Furthermore, in one embodiment, gesture interpretation logic 239 may be used to properly interpret any user gestures, such as according to default settings or user preferences or a combination thereof. For example, a user gesture to touch the screen of flexible display 120 with a thumb and an index finger simultaneously moving towards each other and away from each other may be interpreted as a request for zooming-in and zooming-out, respectively, according to the default settings. Now, for example, this default setting may be applied when the user applies this gesture on the front side of flexible display 120, where the thumb is placed, and index at the back side, or wrapped around side of the flexible display 120 which is wrapped around computing device 100. However, for example, the user may choose to set a user preference to regard the same gesture as turning computing device 100 on or off when this gesture is applied to the back screen of flexible display 120 and similarly, this gesture may be set by a user preference to mean to increase or decrease the volume when it is applied on one of the edges/side screens (e.g., any of the four narrow sides of a rectangular smartphone, etc.) of flexible display 120.

In one embodiment, a single gesture of any kind (e.g., a known gesture or a newly-created gesture) may be interpreted in any number of ways based on user preferences, such as depending on where or on which side of the screen of flexible device 120 the gesture is performed. For example, a typical smartphone or a tablet computer may have a total of six sides (such as a front, a back, and four sides/edges) and thus, a user may set preferences such that when the same gesture (e.g., tapping the screen twice, forming a circle, pressing the screen, etc.) is performed on any of the six different screen portions of flexible display 120, the same gesture may be interpreted differently by gesture interpretation logic 239 as set forth in the user preferences by the user.

In one embodiment, accident prevention logic 241 may be used to prevent an accidental or un-intended touch input by the user. For example, accident prevention logic 241 may be used to detection how a user holds a computing device, such as computing device 100, having wrapped around flexible display 120. In detecting the user's hand grip of computing device 100 (e.g., smartphone, tablet computer, etc.), accident prevention logic 241 may determine that the user merely wishes to use the front portion of flexible display 120 and upon making that determination, accident prevention logic 241 may automatically disable, for example, flexible display 120 on the back and/or on one or more of the sides/edges to make sure the user's fingers touching the screen of flexible display 120 on the back do not make an accidental or unintended input, such as deleting an application (by deleting the application icon), opening an application (by touching the application icon), sending an open email, calling someone, etc. Similarly, if the user flips over computing device 100, accident prevention logic 241 may make a new determination and act accordingly, such as it may disable the user's touch input on the front while enabling the touch input on the back which is the side the user is now using.

In some embodiments, determinations may be made based on user preferences, such as keeping all sides of flexible display 120 on and working when the user plays a game, uses a particular gesture, accesses a particular website, accessing a communication website (e.g., Skype®, Viber®, Tango®, etc.), etc., and similarly, disable one or more sides of flexible display 120, such as upon passing of a pre-determined time period (e.g., 30 seconds), accessing a business application, using a social and/or business network website (e.g., Facebook®, Twitter®, LinkedIn®, etc.), etc.

In one embodiment, display mechanism 110 further includes new gesture creation logic 247 to facilitate creation of any number and type of new gestures, such as fingers grasp on multiple sides of flexible display 120. Using new gesture creation logic 247, flexible display 120 is not limited to only the known or default gestures, pressing on an icon, dragging an icon, single clicking, double clicking, zooming-in, zooming-out, etc., but that the user may choose to be innovative in coming up with any number and type of new gestures and assigning them to perform any number and type of corresponding tasks. For example, the user may choose a new gesture, such as using a thumb and an index finger, the user may simultaneously double tap the front and the back or any of the two sides, or any combination thereof, of flexible display 120 to sign-in or sign-out or perform any number and type of other tasks. For example, the user may go to user setting or preferences to put flexible display 120 in the new gesture generation mode where the user may create and test any number and type of gestures and associate the new gestures to any number and type of tasks or functions to be performed by computing device 100 via flexible display 120 and video/touch control logic 233. For example and in one embodiment, a motion/touch/pressure detection component, working with touch/motion detection logic 237, may be embedded in flexible display 120 (such as in-cell touch, on-cell touch, etc.), or as a separate wraparound motion/touch/pressure sensor on top of the flexible display 120 (e.g., nano wire touch sensor, Atmel® XSense®, etc.). It is contemplated that motion/touch detection logic 237 may be used to detect motion, touch, and pressure applied to top or any of internal layers of flexible display 120.

Furthermore, in one embodiment, security logic 249 may be used to provide the necessary security for computing device 100 via flexible display 120. For example, in some embodiments, security logic 249 may facilitate biometric sensors at computing device 100 to test the user's finger prints before allowing the user to sign-in and to prevent any authorized access. It is contemplated that using new gesture creation logic 247, the user may choose to create any number and type of gestures that may be controlled and/or verified through security logic 249 to provide the security to computing device 100 as desired or necessitated by the user. Some examples of such gestures may include (but not limited to) fingers to draw shapes/signature simultaneously on the front and rear surfaces or on the edges of flexible display 120.

It is contemplated that computing device 100, having flexible wraparound display 120, may include one or more sensors to work with various components of display mechanism 110, where the one or more sensors may include (but not limited to) an array of sensor elements where these elements may be complementary metal oxide semiconductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. For example, an image sensor converts light received through optics assembly into pixel values, where each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., Moving Picture Experts Group (MPEG), Joint Photographic Expert Group (JPEG), etc.) may be employed for this encoding and/or compression.

Similarly, in one embodiment, computing device 100 may further include any number and type of touch/image components to work with various components of display mechanism 110, where these touch/image components may include (but not limited to) image capturing devices (e.g., one or more cameras, etc.) and image sensing devices, such as (but not limited to) context-aware sensors (e.g., temperature sensors, facial expression and feature measurement sensors, etc.) working with one or more cameras, environment sensors (such as to sense background colors, lights, etc.), biometric sensors (such as to detect fingerprints, facial points or features, etc.), and the like. Computing device 100 may also include one or more software applications, such as business applications, social network websites (e.g., Facebook®, Google+®, Twitter®, etc.), business networking websites (e.g., LinkedIn®, etc.), communication applications (e.g., Skype®, Tango®, Viber®, etc.), games and other entertainment applications, etc., offering one or more user interfaces (e.g., web user interface (WUI), graphical user interface (GUI), touchscreen, etc.) via flexible display 120, while ensuring compatibility with changing technologies, parameters, protocols, standards, etc.

Communication/compatibility logic 251 may be used to facilitate dynamic communication and compatibility between computing device 100 and any number and type of other computing devices (such as a mobile computing device, a desktop computer, a server computing device, etc.), storage devices, databases and/or data sources (such as data storage devices, hard drives, solid-state drives, hard disks, memory cards or devices, memory circuits, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

Although one or more examples (e.g., double tapping, 1-piece front and back screen touch gesture, smartphone, table computers, LCD display panels, etc.) may be discussed throughout this document for brevity, clarity, and ease of understanding, it is contemplated that embodiments are not limited to any particular number and type of gestures, display panels, computing devices, users, network or authentication protocols or processes, or the like. For example, embodiments are not limited to any particular network security infrastructures or protocols (e.g., single-sign-on (SSO) infrastructures and protocols) and may be compatible with any number and type of network security infrastructures and protocols, such as security assertion markup language (SAML), OAuth, Kerberos, etc.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "gesture", "tapping", "LCD", "1-piece", "flexible", "wraparound", "zooming-in", "zooming-out", etc., should not be read to limit embodiments to software or devices that carry that label in products or in literature external to this document.

It is contemplated that any number and type of components may be added to and/or removed from flexible wraparound display mechanism 110 and/or flexible wraparound display 120 to facilitate various embodiments including adding, removing, and/or enhancing certain features. For brevity, clarity, and ease of understanding of flexible wraparound display mechanism 110 and flexible wraparound display 120, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
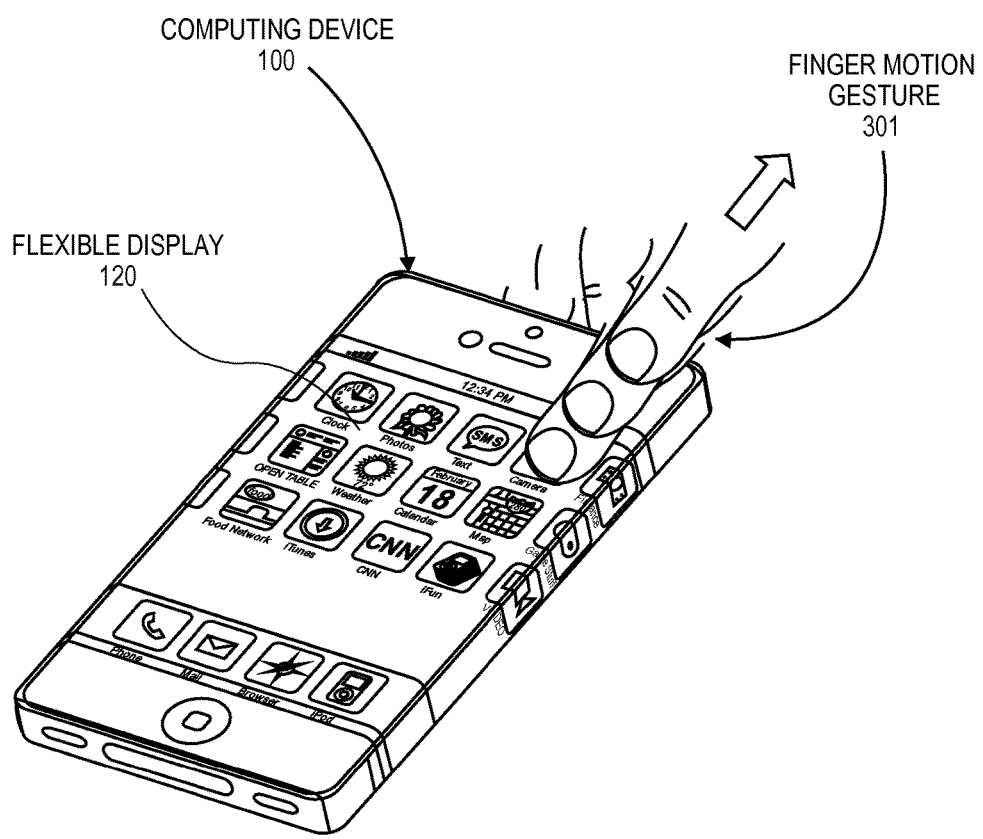
FIG. 3A illustrates a computing device having a flexible wraparound display according to one embodiment.

FIG. 3A illustrates a computing device 100 having a flexible wraparound display 120 according to one embodiment. As aforementioned, with regard to FIG. 2C, new gesture creation logic 247 of display mechanism 110 may be used to create new gestures. In the illustrated embodiment, the front side of computing device 100 is shown to have a single flexible display 120 (as opposed to a conventional single or dual display) adopting one or more new gestures, such as the illustrated a 1-piece or a finger motion gesture 301. As illustrated, a new gesture 301 may be created to allow two fingers to be used to simultaneously grasp or slide both the front and the back surfaces of flexible display 120. It is contemplated that the motion 301 is not limited to a particular direction (such as down-up, left-right, diagonal, sideways, etc.) or to a particular section or surface (e.g., front, back, top/bottom edges, left-right edges, etc.) of flexible display 120. As discussed with reference to FIGS. 2A-2C, as opposed to a conventional single display or dual display, the novel flexible display 120 is wrapped around computing device 100 while using a single display controller including a single graphics controller, touch controller, motion controller, cable interface, etc. such as when compared with conventional dual display system, to provide for a simpler and cost-efficient hardware interface.

Figure 3B:
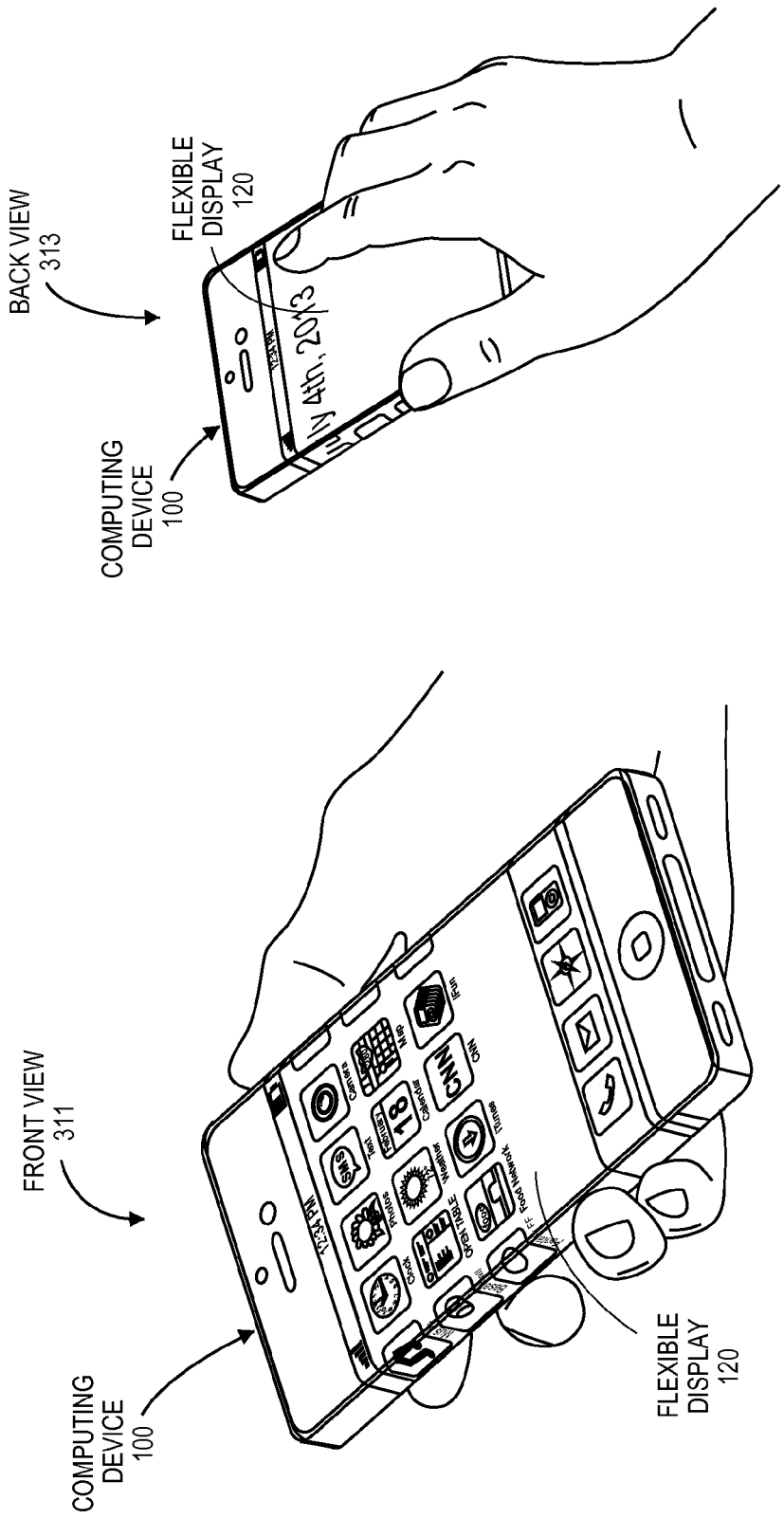
FIG. 3B illustrates a computing device having a flexible wraparound display according to one embodiment.

FIG. 3B illustrates a computing device 100 having a flexible wraparound display 120 according to one embodiment. The illustrated embodiment provide a front view 311 and back view 313 of computing device 100 having flexible display 120 wrapped around it. For example, the front surface of computing device 100, as shown via front view 311, the entire portion of the front surface may have flexible display 100 (showing, for example, application icons), while the back surface, as shown via back view 313, may cover only a portion of the back space (showing, for example, date and time, etc.) to leave the rest of the back space for other components, such as battery, etc. It is further illustrated that merely flipping of wrist may be needed to view both sides, front and back views 311-313, of flexible display 120 and similarly, in some embodiments, edges of computing device 100 may also have portions of and accessibility to flexible display 120.

Figure 3C:
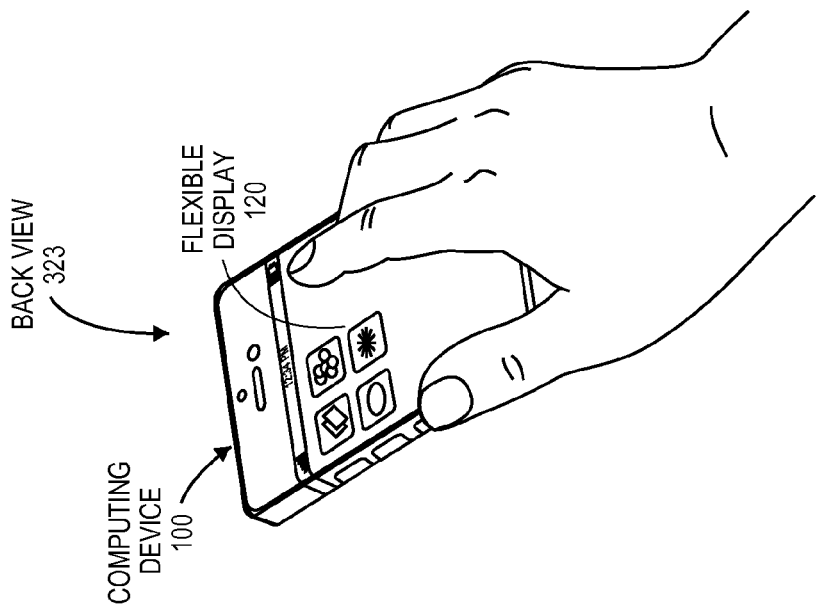
FIG. 3C illustrates a computing device having a flexible wraparound display according to one embodiment.
Figure 3C:
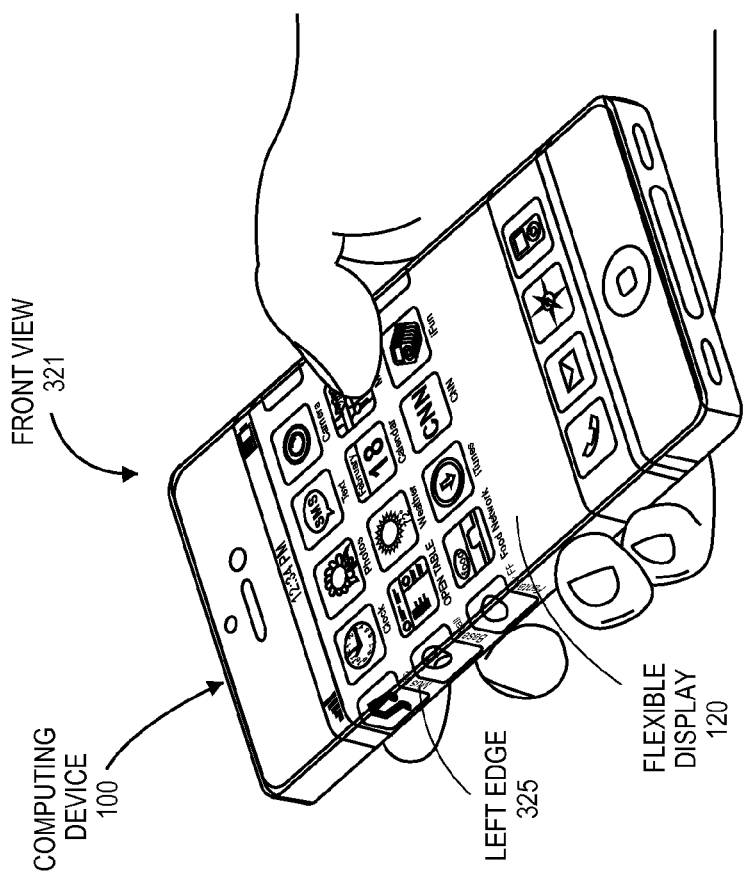

FIG. 3C illustrates a computing device 100 having a flexible wrap around display 120 according to one embodiment. As with FIG. 3B, the illustrated embodiment here shows two surfaces, front and back views 321-323, of flexible display 120 wrapped around computing device 100 that can be used by a user for touch inputs. Touch inputs are not limited to only the front and the back surfaces of flexible display 120 and that, for example, any portion of flexible display 120 being shown on the four sides/edges, such as left edge 325, of computing device 100 may also be used for touch input.

Figure 3D:
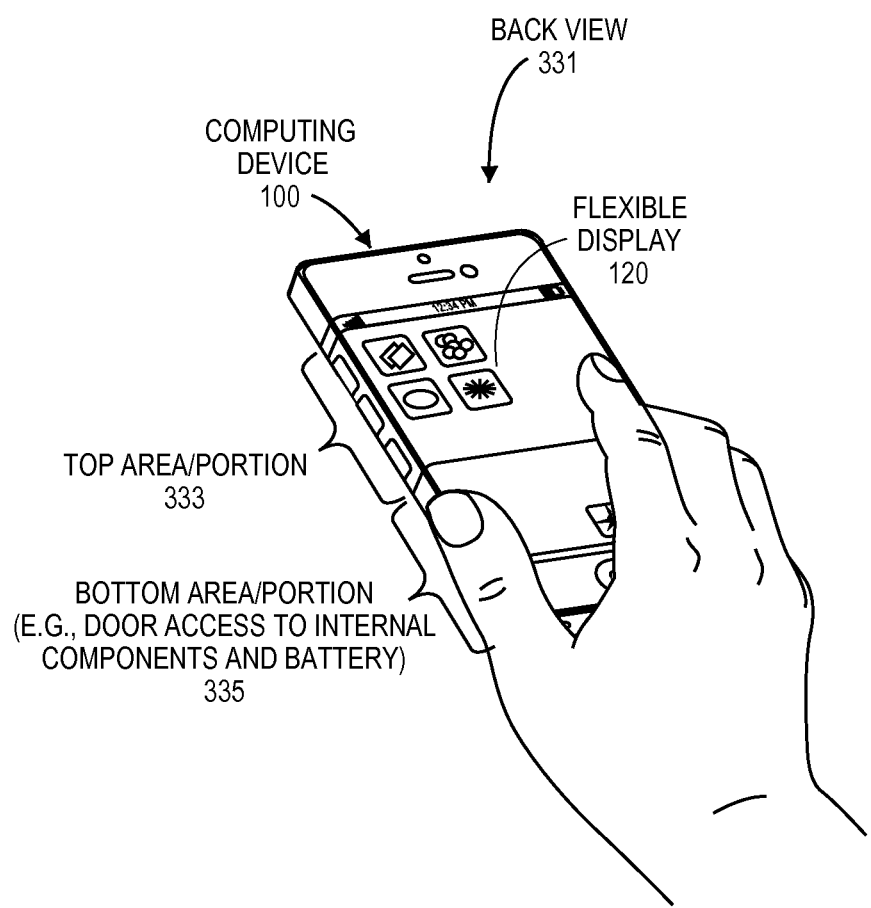
FIG. 3D illustrates a computing device having a flexible wraparound display according to one embodiment.

FIG. 3D illustrates a computing device 100 having a flexible wraparound display 120 according to one embodiment. As illustrated, the back surface of computing device 100, as shown by back view 331, flexible display 120 may cover a certain portion or area, such as top area/portion 335, of the back surface so that the rest of the back surface may remain and be used for other purposes and/or necessities, such as providing a door access to internal components, batter compartment, etc.

Figure 5:
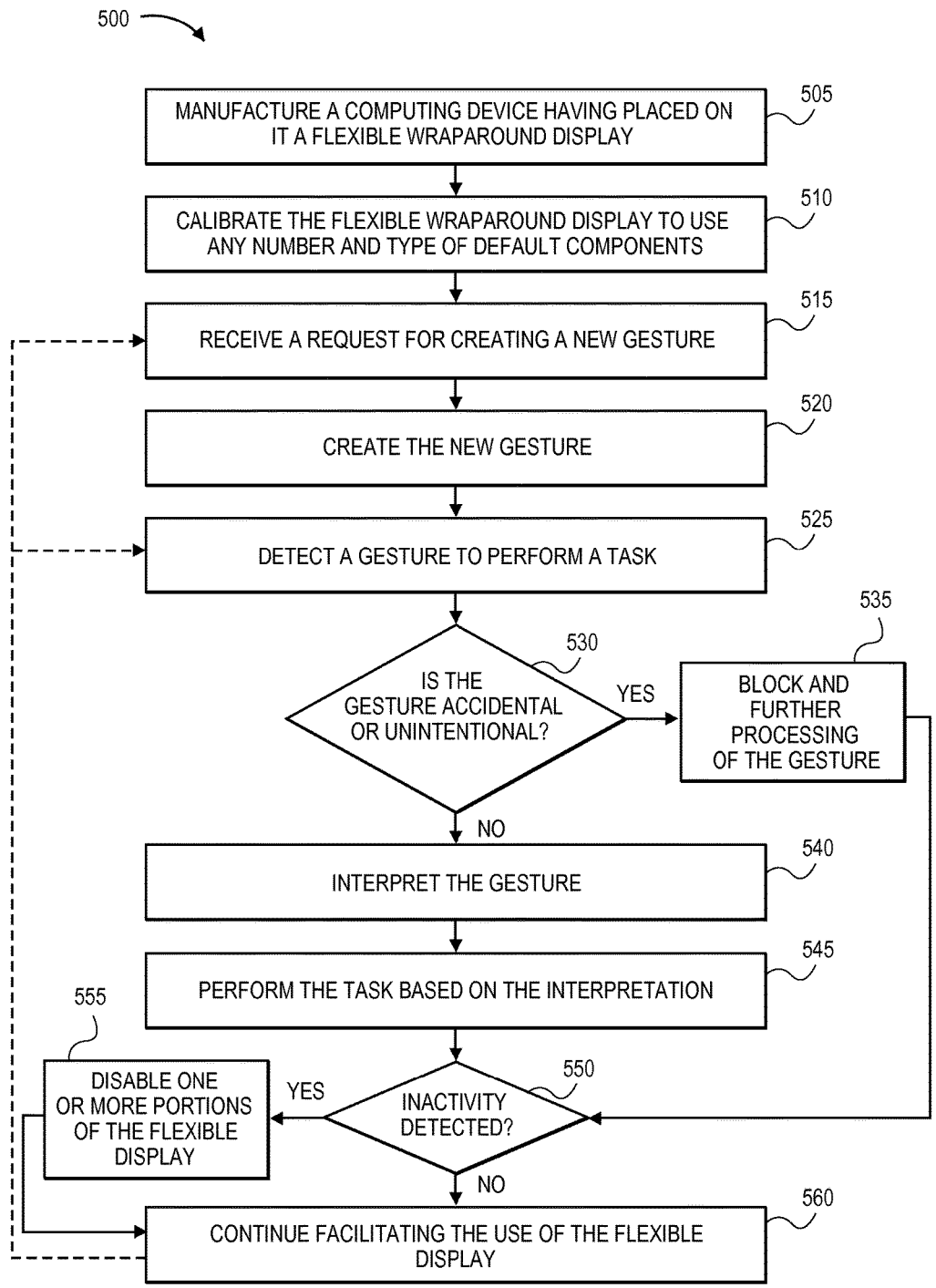
FIG. 5 illustrates a method for facilitating user performance-based simulation and presentation of a corresponding avatar at a computing device according to one embodiment.

Referring to FIG. 5, it illustrates a method 500 for facilitating a flexible wraparound display at a computing device according to one embodiment. Method 500 may be performed by processing logic that may comprise hardware (e.g., circuitry, dedicated logic, programmable logic, etc.), software (such as instructions run on a processing device), or a combination thereof. In one embodiment, method 500 may be performed by flexible wraparound display 120 as facilitated by flexible wraparound display mechanism 110 FIG. 1. The processes of method 500 are illustrated in linear sequences for brevity and clarity in presentation; however, it is contemplated that any number of them can be performed in parallel, asynchronously, or in different orders. For brevity, clarity, and ease of understanding, many of the details discussed with reference to other Figures in this document are not discussed or repeated here.

Method 500 begins at block 505 with manufacturing a computing device (e.g., mobile computing device, such as a smartphone, a table computer, etc.) having placed a flexible wraparound display over the computing device. In one embodiment, at block 510, the flexible wraparound display is calibrated such that it employed and facilitated using the existing/default single or dual display-related components, such as display controller including a graphics controller, touch controller, motion controller, interfaces, cables/wires, etc., without having to require any new controllers or other relevant components.

At block 515, a request for a new gesture (e.g., touching one or more parts of the flexible display in a certain manner to trigger one or more particular tasks) is received from a user and, at block 520, the new gesture is created. In one embodiment, the new gesture may be generated as requested by the user and/or according to the user's preferences. For example and in one embodiment, the flexible display may be manipulated by the user to generate any number and type of gestures that are presented as touch inputs which may then be interpreted to perform any number and type of corresponding tasks. For example, the user may choose to create a new customized gesture to perform a customized task, where the user may choose to use the same new gesture to perform more than one customized tasks, such as when the gesture is performed using a particular portion of the flexible display (e.g., tapping or swapping on the flexible display screen with one or more fingers on the front of the flexible display as opposed to its back or one or more sides, etc.) or while using a particular software application (e.g., tapping twice on the flexible display may be regarded as signing-off within newspaper website as opposed when using an email application where it may be interpreted as a request for sending an email, etc.) or when the gesture is triggered during a certain time of the day (e.g., from 7 AM-10 PM, circling once with the index finger may be interpreted as putting the computing device in hibernation, while the same gesture when performed during 10PM-7AM may be set to be interpreted as signing-off and turning of the computing device, etc.).

At block 525, one or more gestures (e.g., one or more touch inputs) as triggered or performed by the user on or using the flexible display (e.g., double tapping the back screen of the flexible display on the computing device, etc.) to perform one or more corresponding tasks are detected by the flexible display. At block 530, a determination is made as to whether a gesture (e.g., touch input) is accidental or un-intentional as determined by one or more sensors of the computing device and accident prevention logic 241 of FIG. 2C, such as in detecting based on 1) how the computing device was being held in the hand by the user (e.g., where the thumb is placed with respect to the fingers, etc.), 2) a time period for which certain portions of the flexible display were being used or remained unused, 3) in a manner that the user touches the flexible display (e.g., how often, pauses between touches, etc.), 4) content type, such as a number and type of software applications being used (e.g., calendar, social networking websites, news websites, business applications, etc.), 5) historical use of flexible display, etc.

At block 535, if the gesture is determined to be accidental or un-intentional, the corresponding input whether received or sensed or interpreted, etc. is discarded and any further processing of the gesture is blocked. At block 540, if, however, the gesture or touch input is regarded as intentional, the gesture is interpreted according to one or more of the default settings and user settings or preferences (such as if the default settings were altered by the user or the gesture was newly-created or customized by the user according to the user settings/preferences, etc.). At block 545, the corresponding one or more tasks, as requested through the gesture, are performed based on the interpretation of the gesture.

At block 550, a determination is made as to whether any portion of the flexible display is left to be turned inactive. For example and in one embodiment, as aforementioned with regard to power saving logic 243 and its surface detection module 245 of FIG. 2C, one or more sensors of the computing device along with surface detection module 245 may sense whether a portion of face (e.g., back or front) is placed on or faces a surface (such as a table, a desk, a chair, a device case, an inside of coat pocket, a car seat, etc.) by, for example, determining of the computing device is being held with a hand or rested on a surface to further determine whether that portion of the flexible display may be regarded as inactive and accordingly, dimmed-off or turned-off. At block 555, if one or more portions of the flexible display are determined to be inactive, the one or more inactive portions are dimmed-off or turned-off to conserve power. At block 560, if none of the portions of the flexible display are determined to be inactive, the flexible display continues to remain active and is facilitated to be used for subsequent processes, such as receiving requests for new gestures at block 515 and/or detecting one or more gestures to perform one or more corresponding tasks at block 525.

Figure 4:
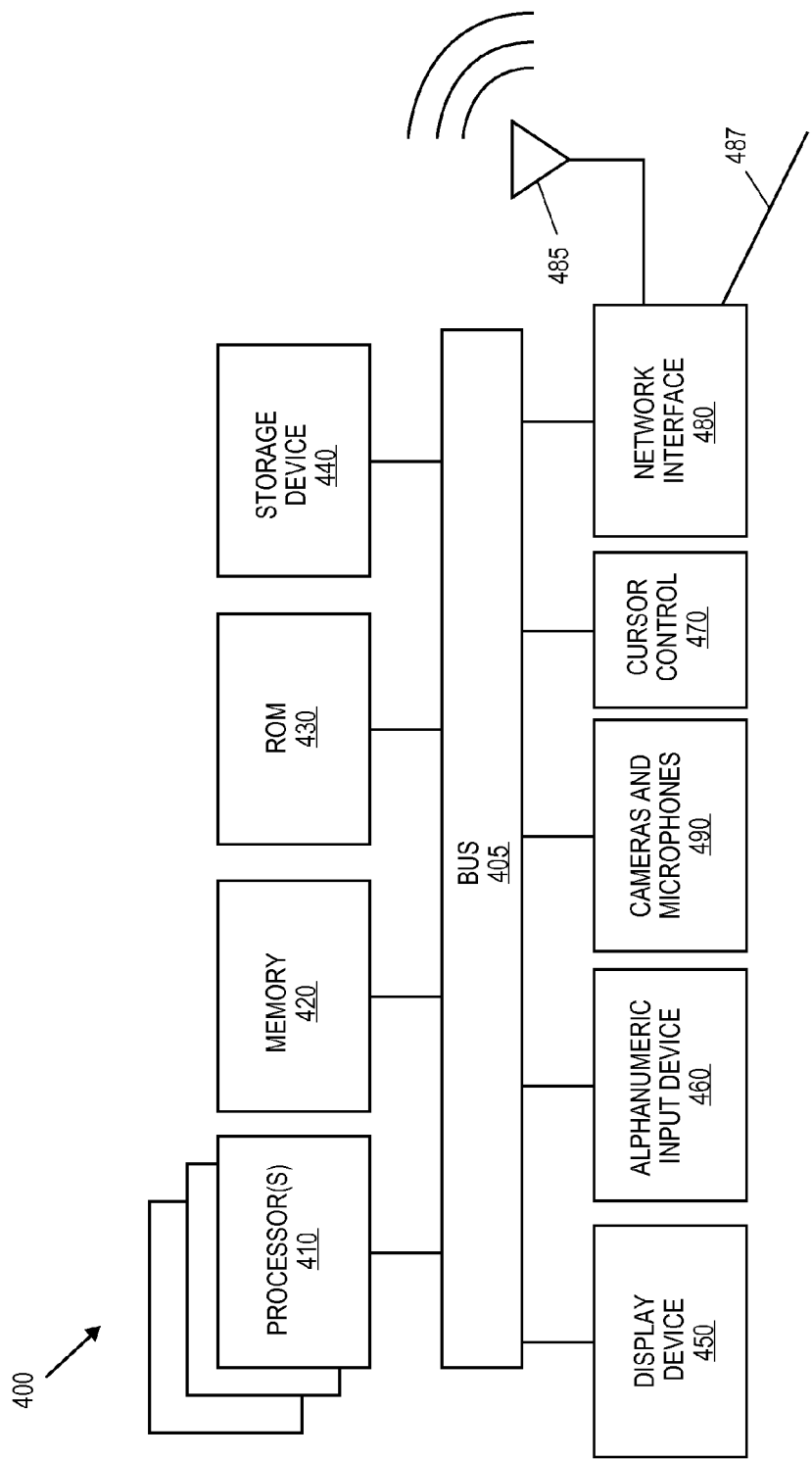
FIG. 4 illustrates computer system suitable for implementing embodiments of the present disclosure according to one embodiment.

Now referring to FIG. 4, it illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100 of FIG. 1.

Computing system 400 includes bus 405 (or, for example, a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate flexible wraparound displays, comprising: a flexible wraparound display being represented as a single display that is flexibly wrapped around the apparatus; and display controller engine to calibrate the flexible wraparound display to perform its functions using one or more default components of the apparatus.

Example 2 includes the subject matter of Example 1, wherein the default components are based on default electrical and mechanical settings, wherein the default components comprise one or more of a display controller including one or more of a video controller, a motion controller, a graphics controller, and a touch controller.

Example 3 includes the subject matter of Example 1, further comprising new gesture generation logic to receive a request for a new gesture to be used with the flexible wraparound display, wherein the new gesture generation logic to create and facilitate the new gesture to trigger performance of one or more tasks.

Example 4 includes the subject matter of Example 1 or 3, wherein the new gesture comprises a customized gesture as desired or necessitated by a user, wherein the one or more tasks include one or more existing tasks or one or more new tasks to be requested by the flexible wraparound display and performed at the apparatus.

Example 5 includes the subject matter of Example 3, wherein the new gesture to trigger performance of a first task when executed on a first side of the flexible wraparound display, and where the new gesture to trigger performance of a second task when executed on a second side of the flexible wraparound display, wherein the flexible wraparound display comprises multiple sides including a front side, a back side, and a plurality of edges.

Example 6 includes the subject matter of Example 1, further comprising: motion/touch detection logic to receive a gesture to request performance of one or more tasks; and gesture interpretation logic to interpret the gesture based on one or more of default settings and user preferences, wherein the gesture interpretation logic is further to facilitate the performance of the one or more tasks.

Example 7 includes the subject matter of Example for 6, further comprising accident prevention logic to determine whether the gesture is accidental or unintentional, wherein the accident prevention logic is further to block the gesture if it is determined to be accidental or unintentional.

Example 8 includes the subject matter of Example 1, further comprising power saving logic including a surface detection module to detect a side of the flexible wraparound display facing a surface over a period of time, wherein the power saving logic to turn-down or turn-off power on the side facing the surface based on the detection by the surface detection module.

Example 9 includes the subject matter of Example 6, wherein the gesture to trigger performance of a first task when executed on a first side of the flexible wraparound display, and where the gesture to trigger performance of a second task when executed on a second side of the flexible wraparound display.

Example 10 includes the subject matter of Example 1, further comprising security logic to employ biometric measures to facilitate secured use of the flexible wraparound display, wherein the biometric measures include verifying the user's fingerprints to avoid unauthorized or unauthenticated access to the apparatus.

Some embodiments pertain to Example 11 that includes a method for facilitating flexible wraparound displays, comprising: placing a flexible wraparound display at a computing device, wherein the flexible wraparound display being represented as a single display that is flexibly wrapped around the computing device; and calibrating the flexible wraparound display to perform its functions using one or more default components of the computing device.

Example 12 includes the subject matter of Example 11, wherein the default components are based on default electrical and mechanical settings, wherein the default components comprise one or more of a display controller including one or more of a video controller, a motion controller, a graphics controller, and a touch controller.

Example 13 includes the subject matter of Example 11, further comprising: receiving a request for a new gesture to be used with the flexible wraparound display; and creating and facilitating the new gesture to trigger performance of one or more tasks.

Example 14 includes the subject matter of Example 13, wherein the new gesture comprises a customized gesture as desired or necessitated by a user, wherein the one or more tasks include one or more existing tasks or one or more new tasks to be requested by the flexible wraparound display and performed at the computing device.

Example 15 includes the subject matter of Example 13, wherein the new gesture to trigger performance of a first task when executed on a first side of the flexible wraparound display, and where the new gesture to trigger performance of a second task when executed on a second side of the flexible wraparound display, wherein the flexible wraparound display comprises multiple sides including a front side, a back side, and a plurality of edges.

Example 16 includes the subject matter of Example 11, further comprising: receiving a gesture to request performance of one or more tasks; and interpreting the gesture based on one or more of default settings and user preferences, wherein the gesture interpretation logic is further to facilitate the performance of the one or more tasks.

Example 17 includes the subject matter of Example 16, further comprising: determining whether the gesture is accidental or unintentional; and blocking the gesture if it is determined to be accidental or unintentional.

Example 18 includes the subject matter of Example 11, further comprising: detecting a side of the flexible wraparound display facing a surface over a period of time; and turning-down or turning-off power on the side facing the surface based on the detection by the surface detection module.

Example 19 includes the subject matter of Example 16, wherein the gesture to trigger performance of a first task when executed on a first side of the flexible wraparound display, and where the gesture to trigger performance of a second task when executed on a second side of the flexible wraparound display.

Example 20 includes the subject matter of Example 11, further comprising employing biometric measures for facilitating secured use of the flexible wraparound display, wherein the biometric measures include verifying the user's fingerprints to avoid unauthorized or unauthenticated access to the apparatus.

Example 21 includes at least one machine-readable medium comprising a plurality of instructions that in response to being executed on a computing device, causes the computing device to carry out operations according to any one of the aforementioned examples 11 to 20.

Example 22 includes at least one non-transitory or tangible machine-readable medium comprising a plurality of instructions that in response to being executed on a computing device, causes the computing device to carry out operations according to any one of the aforementioned examples 11 to 20.

Example 23 includes a system comprising a mechanism to carry out operations according to any one of the aforementioned examples 11 to 20.

Example 24 includes an apparatus comprising means to carry out operations according to any one of the aforementioned examples 11 to 20.

Example 25 includes a computing device arranged to carry out operations according to any one of the aforementioned examples 11 to 20.

Example 26 includes a communications device arranged to carry out operations according to any one of the aforementioned examples 11 to 20.

Some embodiments pertain to Example 27 includes a system comprising a storage device having instructions, and a processor to execute the instructions to facilitate a mechanism to perform one or more operations comprising: placing a flexible wraparound display at a computing device, wherein the flexible wraparound display being represented as a single display that is flexibly wrapped around the computing device; and calibrating the flexible wraparound display to perform its functions using one or more default components of the computing device.

Example 28 includes the subject matter of Example 27, wherein the default components are based on default electrical and mechanical settings, wherein the default components comprise one or more of a display controller including one or more of a video controller, a motion controller, a graphics controller, and a touch controller.

Example 29 includes the subject matter of Example 27, wherein the operations further comprise: receiving a request for a new gesture to be used with the flexible wraparound display; and creating and facilitating the new gesture to trigger performance of one or more tasks.

Example 30 includes the subject matter of Example 29, wherein the new gesture comprises a customized gesture as desired or necessitated by a user, wherein the one or more tasks include one or more existing tasks or one or more new tasks to be requested by the flexible wraparound display and performed at the computing device.

Example 31 includes the subject matter of Example 29, wherein the new gesture to trigger performance of a first task when executed on a first side of the flexible wraparound display, and where the new gesture to trigger performance of a second task when executed on a second side of the flexible wraparound display, wherein the flexible wraparound display comprises multiple sides including a front side, a back side, and a plurality of edges.

Example 32 includes the subject matter of Example 27, wherein the operations further comprise: receiving a gesture to request performance of one or more tasks; and interpreting the gesture based on one or more of default settings and user preferences, wherein the gesture interpretation logic is further to facilitate the performance of the one or more tasks.

Example 33 includes the subject matter of Example 32, wherein the operations further comprise: determining whether the gesture is accidental or unintentional; and blocking the gesture if it is determined to be accidental or unintentional.

Example 34 includes the subject matter of Example 27, wherein the operations further comprise: detecting a side of the flexible wraparound display facing a surface over a period of time; and turning-down or turning-off power on the side facing the surface based on the detection by the surface detection module.

Example 35 includes the subject matter of Example 32, wherein the gesture to trigger performance of a first task when executed on a first side of the flexible wraparound display, and where the gesture to trigger performance of a second task when executed on a second side of the flexible wraparound display.

Example 36 includes the subject matter of Example 27, wherein the operations further comprise: employing biometric measures for facilitating secured use of the flexible wraparound display, wherein the biometric measures include verifying the user's fingerprints to avoid unauthorized or unauthenticated access to the apparatus.

Some embodiments pertain to Example 37 includes an apparatus comprising: means for placing a flexible wraparound display at a computing device, wherein the flexible wraparound display being represented as a single display that is flexibly wrapped around the computing device; and means for calibrating the flexible wraparound display to perform its functions using one or more default components of the computing device.

Example 38 includes the subject matter of Example 37, wherein the default components are based on default electrical and mechanical settings, wherein the default components comprise one or more of a display controller including one or more of a video controller, a motion controller, a graphics controller, and a touch controller.

Example 39 includes the subject matter of Example 37, further comprising: means for receiving a request for a new gesture to be used with the flexible wraparound display; and means for creating and facilitating the new gesture to trigger performance of one or more tasks.

Example 40 includes the subject matter of Example 39, wherein the new gesture comprises a customized gesture as desired or necessitated by a user, wherein the one or more tasks include one or more existing tasks or one or more new tasks to be requested by the flexible wraparound display and performed at the computing device.

Example 41 includes the subject matter of Example 39, wherein the new gesture to trigger performance of a first task when executed on a first side of the flexible wraparound display, and where the new gesture to trigger performance of a second task when executed on a second side of the flexible wraparound display, wherein the flexible wraparound display comprises multiple sides including a front side, a back side, and a plurality of edges.

Example 42 includes the subject matter of Example 37, further comprising: means for receiving a gesture to request performance of one or more tasks; and means for interpreting the gesture based on one or more of default settings and user preferences, wherein the gesture interpretation logic is further to facilitate the performance of the one or more tasks.

Example 43 includes the subject matter of Example 42, further comprising: means for determining whether the gesture is accidental or unintentional; and means for blocking the gesture if it is determined to be accidental or unintentional.

Example 44 includes the subject matter of Example 37, further comprising: means for detecting a side of the flexible wraparound display facing a surface over a period of time;

and means for turning-down or turning-off power on the side facing the surface based on the detection by the surface detection module.

Example 45 includes the subject matter of Example 42, wherein the gesture to trigger performance of a first task when executed on a first side of the flexible wraparound display, and where the gesture to trigger performance of a second task when executed on a second side of the flexible wraparound display.

Example 46 includes the subject matter of Example 37, further comprising: means for employing biometric measures for facilitating secured use of the flexible wraparound display, wherein the biometric measures include verifying the user's fingerprints to avoid unauthorized or unauthenticated access to the apparatus.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a wraparound display being represented as a single display that is flexibly wrapped around the apparatus, wherein the wraparound display is communicatively and integratively part of the apparatus such that the wraparound display is on a front side, a back side, and others sides and edges of the apparatus;
   display controller engine to calibrate the wraparound display to perform one or more functions using one or more default components of the apparatus, wherein the display controller engine to facilitate one or more sensors incorporated into the wraparound display to sense a touch on the wraparound display;
   gesture interpretation logic to interpret the touch to determine whether the touch is a user touch or a non-user touch, wherein the user touch is initiated by a user having access to the apparatus, wherein the user touch is interpreted into a gesture to trigger an action in accordance with one or more characteristics of the gesture, wherein the action includes performance of one or more tasks,
   wherein the gesture interpretation logic is further to interpret whether the non-user touch is a result of a surface touching the apparatus, wherein a surface detection module senses whether the surface has a density unlikely to be interpreted into a gesture to trigger an action, including the surface density consistent with any one of a furniture surface, an interior compartment of clothing or luggage, the surface density interpreted to determine whether to initiate one or more power-saving measures; and
   power saving logic to maintain a current level of power or initiate the one or more power-saving measures including ajusting the current level to a new level or turning-off the power.

2. The apparatus of claim 1, wherein the default components are based on default electrical and mechanical settings, wherein the default components comprise one or more of a display controller including one or more of a video controller, a motion controller, a graphics controller, and a touch controller.

3. The apparatus of claim 1, further comprising new gesture generation logic to receive a request for the gesture to be used with the wraparound display, wherein the new gesture generation logic to create and facilitate the gesture to trigger performance of the one or more tasks.

4. The apparatus of claim 3, wherein the gesture comprises a customized gesture as desired or necessitated by the user, wherein the one or more tasks include one or more existing tasks or one or more new tasks to be requested by the wraparound display and performed at the apparatus.

5. The apparatus of claim 3, wherein the gesture to trigger performance of a first task when executed on a first side of the wraparound display, and wherein the gesture to trigger performance of a second task when executed on a second side of the wraparound display, wherein the wraparound display comprises multiple sides including the front side, the back side, and a plurality of sides and edges.

6. The apparatus of claim 1, further comprising:
   motion/touch detection logic to receive the gesture to request performance of the one or more tasks; and
   gesture interpretation logic to interpret the gesture based on one or more of default settings and user preferences, wherein the gesture interpretation logic is further to facilitate the performance of the one or more tasks.

7. The apparatus of claim 1, further comprising accident prevention logic to determine whether the gesture is accidental or unintentional, wherein the accident prevention logic to determine whether the user touch is accidental or unintentional, wherein the accident prevention logic is further to ignore the user touch that is determined to be unintentional.

8. The apparatus of claim 6, wherein the gesture to trigger performance of a first task when executed on a first side of the wraparound display, and where the gesture to trigger performance of a second task when executed on a second side of the wraparound display.

9. The apparatus of claim 1, further comprising security logic to employ biometric measures to facilitate secured use of the wraparound display, wherein the biometric measures include verifying the user's fingerprints to avoid unauthorized or unauthenticated access to the apparatus.

10. A method comprising:
    flexibly wrapping a wraparound display around a computing device, wherein the wraparound display being represented as a single display, wherein the wraparound display is communicatively and integratively part of the computing device such that the wraparound display is on a front side, a back side, and others sides and edges of the computing device;
    calibrating the wraparound display to perform one or more functions using one or more default components of the computing device, wherein the display controller engine to facilitate one or more sensors incorporated into the wraparound display to sense a touch on the wraparound display;
    interpreting the touch to determine whether the touch is a user touch or a non-user touch, wherein the user touch is initiated by a user having access to the apparatus, wherein the user touch is interpreted into a gesture to trigger an action in accordance with one or more characteristics of the gesture, wherein the action includes performance of one or more tasks, interpreting whether the non-user touch is a result of a surface touching the apparatus, wherein a surface detection module senses whether the surface has a density unlikely to be interpreted into a gesture to trigger an action, including the surface density consistent with any one of a furniture surface, an interior compartment of clothing or luggage, the surface density interpreted to determine whether to initiate one or more power-saving measures; and maintaining a current level of power or initiating the one or more power-saving measures including ajusting the current level to a new level or turning-off the power.

11. The method of claim 10, wherein the default components are based on default electrical and mechanical settings, wherein the default components comprise one or more of a display controller including one or more of a video controller, a motion controller, a graphics controller, and a touch controller.

12. The method of claim 10, further comprising:
receiving a request for the gesture to be used with the wraparound display; and
creating and facilitating the gesture to trigger performance of the one or more tasks.

13. The method of claim 12, wherein the gesture comprises a customized gesture as desired or necessitated by the user, wherein the one or more tasks include one or more existing tasks or one or more new tasks to be requested by the wraparound display and performed at the computing device.

14. The method of claim 12, wherein the gesture to trigger performance of a first task when executed on a first side of the wraparound display, and wherein the gesture to trigger performance of a second task when executed on a second side of the wraparound display, wherein the wraparound display comprises multiple sides including the front side, the back side, and a plurality of sides and edges.

15. The method of claim 10, further comprising:
receiving the gesture to request performance of the one or more tasks; and
interpreting the gesture based on one or more of default settings and user preferences, wherein interpreting includes facilitating the performance of the one or more tasks.

16. The method of claim 10, further comprising:
determining whether the gesture is accidental or unintentional, wherein determining includes determining whether the user touch is accidental or unintentional, and ignoring the user touch that is determined to be unintentional.

17. The method of claim 10, wherein the gesture to trigger performance of a first task when executed on a first side of the wraparound display, and where the gesture to trigger performance of a second task when executed on a second side of the wraparound display.

18. The method of claim 10, further comprising:
employing biometric measures to facilitate secured use of the wraparound display, wherein the biometric measures include verifying the user's fingerprints to avoid unauthorized or unauthenticated access to the computing device.

19. A machine-readable medium comprising instructions which, when executed by a computing device, cause a computing device to perform operations comprising:
accepting a flexible wrapping of a wraparound display around the computing device, wherein the wraparound display being represented as a single display, wherein the wraparound display is communicatively and integratively part of the computing device such that the wraparound display is on a front side, a back side, and others sides and edges of the computing device;
calibrating the wraparound display to perform one or more functions using one or more default components of the computing device, wherein the display controller engine to facilitate one or more sensors incorporated into the wraparound display to sense a touch on the wraparound display;
interpreting the touch to determine whether the touch is a user touch or a non-user touch, wherein the user touch is initiated by a user having access to the apparatus, wherein the user touch is interpreted into a gesture to trigger an action in accordance with one or more characteristics of the gesture, wherein the action includes performance of one or more tasks,
interpreting whether the non-user touch is a result of a surface touching the apparatus, wherein a surface detection module senses whether the surface has a density unlikely to be interpreted into a gesture to trigger an action, including the surface density consistent with any one of a furniture surface, an interior compartment of clothing or luggage, the surface density interpreted to determine whether to initiate one or more power-saving measures; and
maintaining a current level of power or initiating the one or more power-saving measures including ajusting the current level to a new level or turning-off the power.

20. The machine-readable medium of claim 19, wherein the default components are based on default electrical and mechanical settings, wherein the default components comprise one or more of a display controller including one or more of a video controller, a motion controller, a graphics controller, and a touch controller.

21. The machine-readable medium of claim 19, wherien the operations further comprise:
receiving a request for the gesture to be used with the wraparound display; and
creating and facilitating the gesture to trigger performance of the one or more tasks.

22. The machine-readable medium of claim 21, wherein the gesture comprises a customized gesture as desired or necessitated by the user, wherein the one or more tasks include one or more existing tasks or one or more new tasks to be requested by the wraparound display and performed at the computing device.

23. The machine-readable medium of claim 21, wherein the gesture to trigger performance of a first task when executed on a first side of the wraparound display, and wherein the gesture to trigger performance of a second task when executed on a second side of the wraparound display, wherein the wraparound display comprises multiple sides including the front side, the back side, and a plurality of sides and edges.

24. The machine-readable medium of claim 19, wherein the operations further comprise:
receiving the gesture to request performance of the one or more tasks; and interpreting the gesture based on one or more of default settings and user preferences, wherein interpreting includes facilitating the performance of the one or more tasks.

25. The machine-readable medium of claim 19, wherein the operations further comprise: determining whether the gesture is accidental or unintentional, wherein determining includes determining whether the user touch is accidental or unintentional, and ignoring the user touch that is determined to be unintentional.

26. The machine-readable medium of claim 19, wherein the gesture to trigger performance of a first task when executed on a first side of the wraparound display, and where the gesture to trigger performance of a second task when executed on a second side of the wraparound display.

27. The machine-readable medium of claim 19, wherien the operations further comprise: employing biometric measures to facilitate secured use of the wraparound display, wherein the biometric measures include verifying the user's fingerprints to avoid unauthorized or unauthenticated access to the computing device.

* * * * *